United States Patent [19]

Vogelsang

[11] Patent Number: 5,651,432

[45] Date of Patent: Jul. 29, 1997

[54] HYDRODYNAMIC BRAKE

[75] Inventor: Klaus Vogelsang, Crailsheim, Germany

[73] Assignee: Voith Turbo GmbH & Co. KG, Crailsheim, Germany

[21] Appl. No.: 510,518

[22] Filed: Aug. 2, 1995

Related U.S. Application Data

[63] Continuation-in-part of Ser. No. 271,767, Jul. 7, 1994, abandoned.

[30] Foreign Application Priority Data

Jul. 13, 1993 [DE] Germany .................. 43 23 342.2

[51] Int. Cl.$^6$ .................................................... F16D 57/02
[52] U.S. Cl. ........................................... 188/296; 188/293
[58] Field of Search .................................... 188/290, 293, 188/294, 295, 296; 192/3.23, 3.34, 4 B, 58 A–58 C; 60/336, 338

[56] References Cited

U.S. PATENT DOCUMENTS

| | | | |
|---|---|---|---|
| 3,860,097 | 1/1975 | Braschler et al. | 60/330 |
| 3,919,844 | 11/1975 | Elderton | 60/330 |
| 4,169,414 | 10/1979 | Müller | 188/290 |
| 4,200,002 | 4/1980 | Takahashi | 188/69 |
| 4,411,340 | 10/1983 | Bvosius et al. | 188/296 |
| 4,458,792 | 7/1984 | Thomas et al. | 188/296 |
| 4,474,270 | 10/1984 | Vogelsang | 188/296 |
| 4,744,443 | 5/1988 | Brosius | 188/294 |
| 4,773,513 | 9/1988 | Herrmann et al. | 188/274 |
| 4,908,905 | 3/1990 | Kanuo et al. | 188/290 |
| 5,193,654 | 3/1993 | Vogelsang | 188/290 |

Primary Examiner—Robert J. Oberleitner
Assistant Examiner—Chris Schwartz
Attorney, Agent, or Firm—Marshall, O'Toole, Gerstein, Murray & Borun

[57] ABSTRACT

A hydrodynamic brake includes a housing adapted to be filled with a working fluid and to discharge the fluid, a rotor having a plurality of blades, and a stator having a plurality of blades. The number of rotor blades is about 1.2 times to about 1.5 times greater than the number of stator blades.

3 Claims, 2 Drawing Sheets

HYDRODYNAMIC BRAKE

RELATED APPLICATIONS

This is a continuation-in-part of U.S. patent application Ser. No. 08/271,767, filed Jul. 7, 1994, abandoned.

BACKGROUND OF THE INVENTION

1. Field of the Invention

The invention relates to hydrodynamic brakes and in particular to hydrodynamic brakes having rotor and stator blades.

2. Description of Related Technology

Fluid-filled hydrodynamic brakes having a rotor and a stator, each having a plurality of blades, are known in the art. For example, such a brake is disclosed in DE 31 13 408 (corresponding to Vogelsang, U.S. Pat. No. 4,474,270).

Hydrodynamic brake development has focused on the achievement of high density power absorption. Therefore, the brake components (especially the rotor and the stator) have been designed with a view toward having these components participate as much as possible in energy exchange. Attempts have also been made to design a brake in such a way that it can be operated in a desired manner at various operating states.

The high density power absorption attained by such brakes has led to a correspondingly high load on the components involved in oil conduction. As a result, the brakes are noisy which is undesirable for street traffic, especially when the brakes are utilized in buses.

Attempts have been made to reduce the noise level produced by such brakes during their operation while simultaneously maintaining high density power absorption. However, only secondary measures have been attempted which do not address the production of noise, only its effects. Such attempts have included making the housing parts thicker or providing insulating sheaths that surround the entire brake. Both of these measures are relatively expensive, require significant assembly work, increase the area required for the structure (which is especially undesirable) and have not been very effective.

If the acoustic problem is considered alone, it might appear desirable to reduce the number of blades of the rotor and stator in order to reduce the frequency of the periodically recurring flow shocks (i.e. flow impacts) in the brake and thereby reduce the noise made by the brake. However, if the number of brake and stator blades are reduced, but the energy density (and thus the power uptake) of the brake is not likewise reduced, an increase of the energy of the flow shocks occurs resulting in even stronger excitation (i.e. vibration) of the brake components, as well as of the oil flow, producing increased noise. To date, there have been no measures which directly address the root of this problem.

SUMMARY OF THE INVENTION

It is an object of the invention to overcome one or more of the problems described above. It is also an object of the invention to provide a hydrodynamic brake which maintains energy density while exhibiting a reduced noise level as compared to other known hydrodynamic brakes.

According to the invention, a hydrodynamic brake includes a housing adapted to be filled with a working fluid and to discharge the fluid, a rotor having a plurality of blades, and a stator having a plurality of blades. The number of rotor blades is about 1.2 times to about 1.5 times greater than the number of stator blades. Furthermore, the blades of the rotor and stator are substantially uniformly distributed over peripheries of the respective rotor and stator.

Other objects and advantages of the invention will be apparent to those skilled in the art from the following detailed description taken in conjunction with the drawings and the appended claims.

DETAILED DESCRIPTION OF THE INVENTION

In order to decrease the noise made by a hydrodynamic brake, according to the invention, the number of blades of the brake rotor is increased, rather than decreased, so that the rotor has a higher number of blades than a cooperating stator. Optimum results have been obtained when the number of rotor blades is increased about 1.3 times the number of stator blades.

Experiments have shown that when a hydrodynamic brake according to the invention is utilized, energy density is fully retained.

Figure 1:
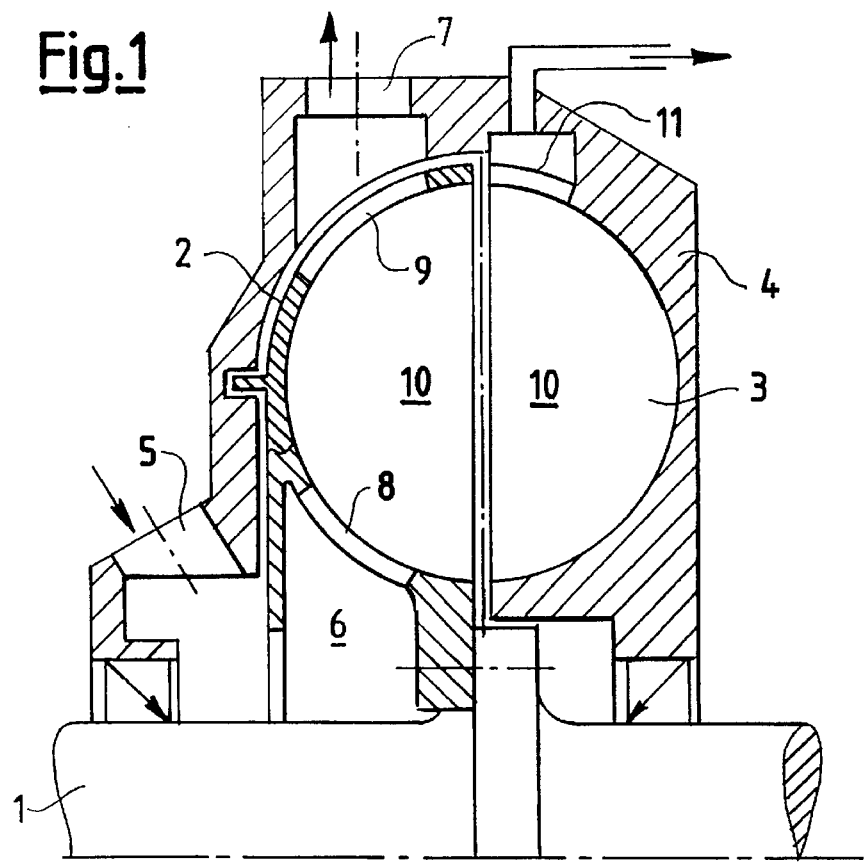
FIG. 1 is a partially schematic longitudinal-sectional view of a hydrodynamic brake according to the invention.

With reference to FIG. 1 of the drawings, a brake or retarder according to the invention has a drive shaft 1 onto which a rotor wheel 2 is wedged. The brake also includes a stator wheel 3 disposed in a housing 4 in a manner so that the wheel 3 cannot rotate. A working fluid may be introduced to the brake via an inlet channel 5 through a control device (not shown). After the fluid enters the channel 5 it first reaches a distribution chamber 6. The fluid is then discharged from the brake through a discharge channel 7. Filling slits 8 are disposed in a radially inner region of the rotor wheel 2 and discharge slits 9 are disposed in a radially outer region thereof. A toroidal working chamber 10 disposed between the rotor wheel 2 and the stator wheel 3 is filled and emptied via the filling and discharge slits 8 and 9, respectively.

Figure 2:
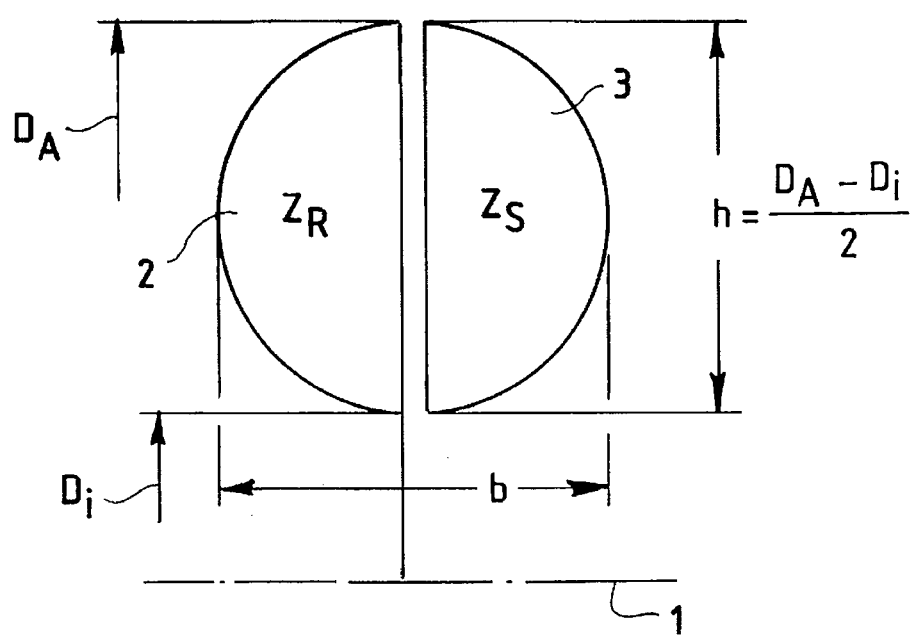
FIG. 2 is a schematic cross-sectional view of the brake of FIG. 1.

With respect to FIG. 2, a highly schematic representation of a brake according to the invention is shown in cross-section and in relation to the rotor shaft 1. FIG. 2 illustrates that the rotor wheel 2 includes a plurality of blades $Z_R$, the stator wheel 3 includes a plurality of blades $Z_S$, and the brake has a profile outside diameter $D_A$, and a profile inside diameter $D_I$ taken with respect to the axis of the drive shaft 1. According to the invention the number of rotor blades $Z_R$ is about 1.2 times to about 1.5 times greater (preferably about 1.35 times greater) than the number of stator blades $Z_S$. For example, as shown in FIGS. 3 and 4, the rotor wheel 2 may have 27 blades $Z_R$ and the stator wheel 3 may have 20 blades $Z_S$.

Figure 3:
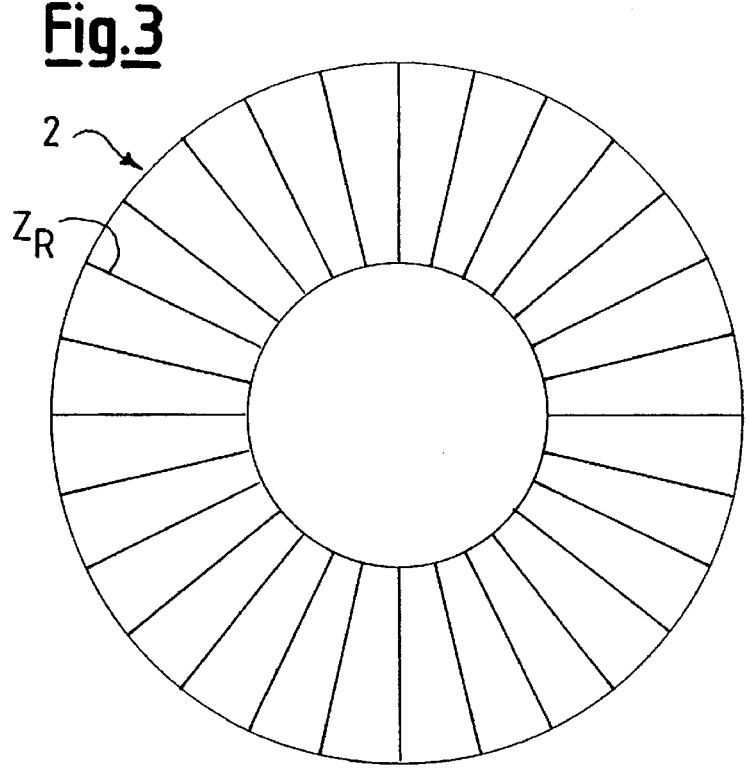
FIG. 3 is a partially schematic and sectional view of a rotor of the hydrodynamic brake of FIG. 1.
Figure 4:
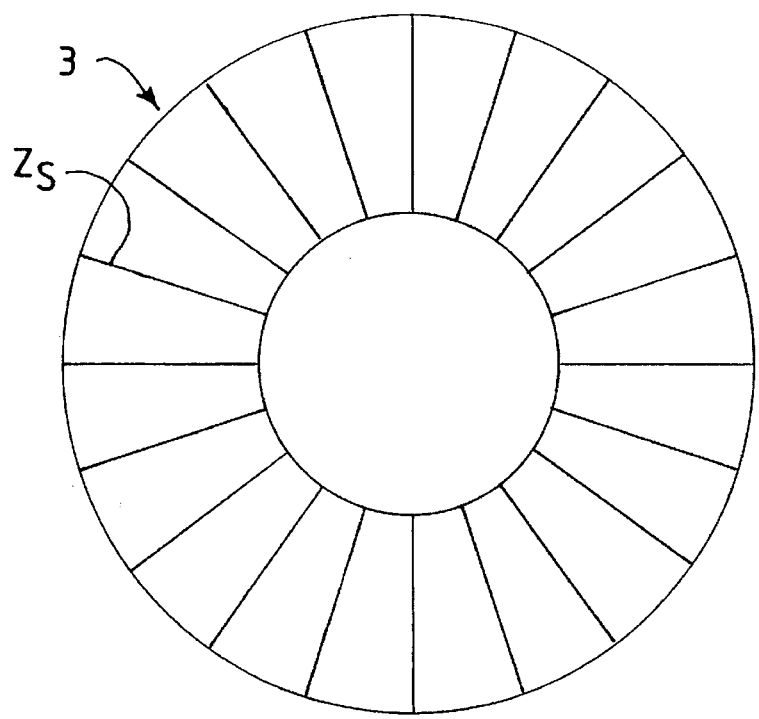
FIG. 4 is a partially schematic and sectional view of a stator of the hydrodynamic brake of FIG. 1.

As shown in FIGS. 3 and 4, according to the invention, the blades of both the rotor and the stator are evenly and uniformly distributed over respective peripheries thereof. In other words, there is a substantially equal distance between neighboring blades of the rotor and also a substantially equal distance between neighboring blades of the stator. Thus, varying the ratio of rotor blades to stator blades does not result in an uneven distribution of blades as shown, for example, by the blade-free region illustrated in FIGS. 1 and 2 of Vogelsang, U.S. Pat. No. 5,193,654.

The foregoing detailed description is given for clearness of understanding only, and no unnecessary limitations should be understood therefrom, as modifications within the scope of the invention will be apparent to those skilled in the art.

I claim:

1. In a hydrodynamic brake having a housing for being filled with a working fluid and for discharging the fluid, a rotor having a plurality of blades $Z_R$, and a stator having a plurality of blades $Z_S$, the improvement wherein the number of rotor blades $Z_R$ is about 1.2 times to about 1.5 times greater than the number of stator blades $Z_S$ and whereby the blades of said rotor and stator are substantially evenly distributed over peripheries of the respective rotor and stator.

2. The improvement of claim 1 wherein the number of rotor blades $Z_R$ is about 1.35 times greater than the number of stator blades $Z_S$.

3. The improvement of claim 1 wherein the hydrodynamic brake further comprises a rotatable drive shaft, the rotor being fixed to the drive shaft and wherein the stator is unrotatably disposed within the housing.

* * * * *